F. R. PERRY & E. S. RICHARDSON.
GLASS FORMING MACHINE.
APPLICATION FILED FEB. 18, 1915.
1,193,182.
Patented Aug. 1, 1916.
3 SHEETS—SHEET 1.
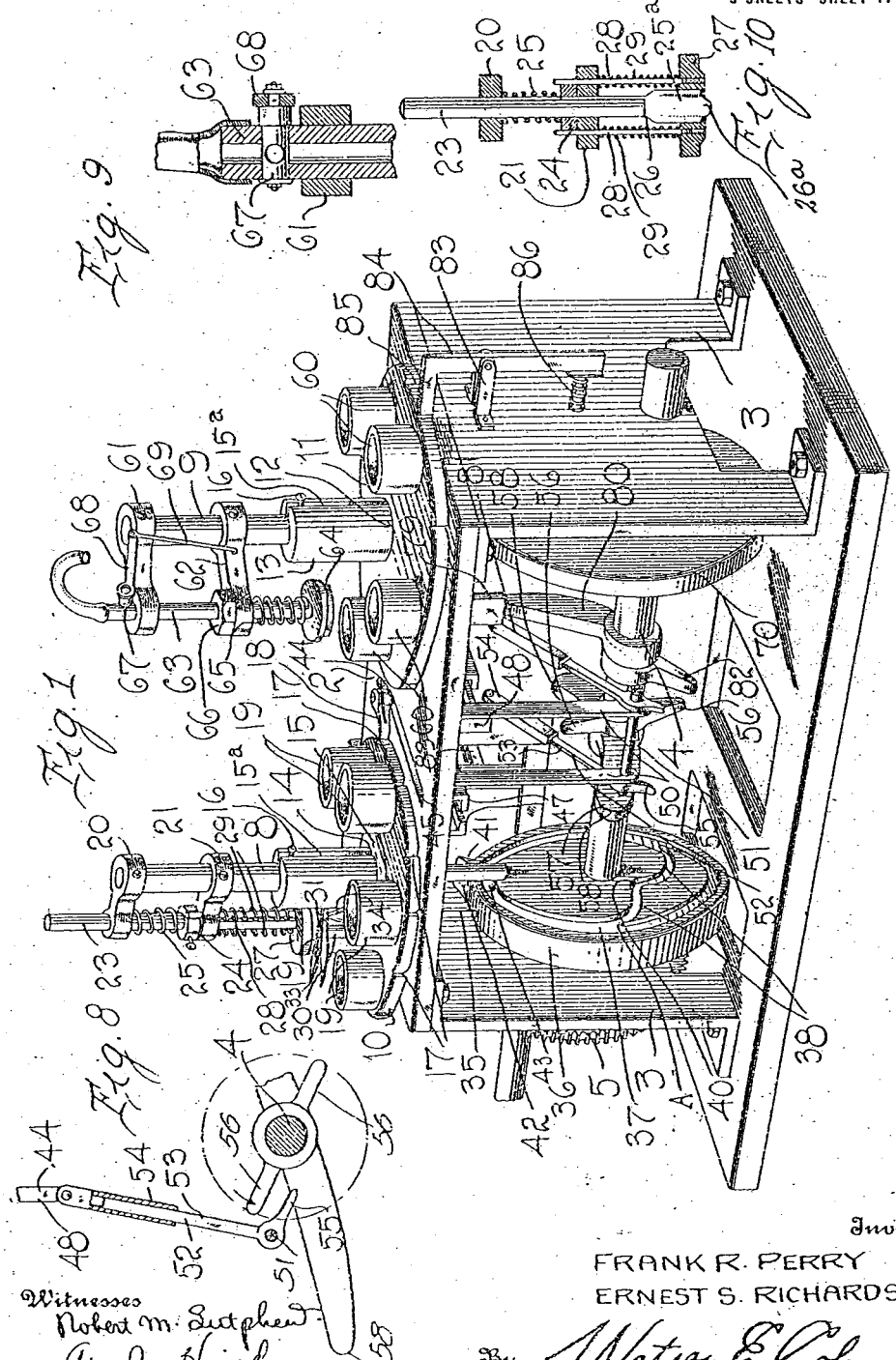
Witnesses
Robert M. Sutphen
A. L. Hind
Inventors
FRANK R. PERRY
ERNEST S. RICHARDSON
By Watson E. Coleman
Attorney

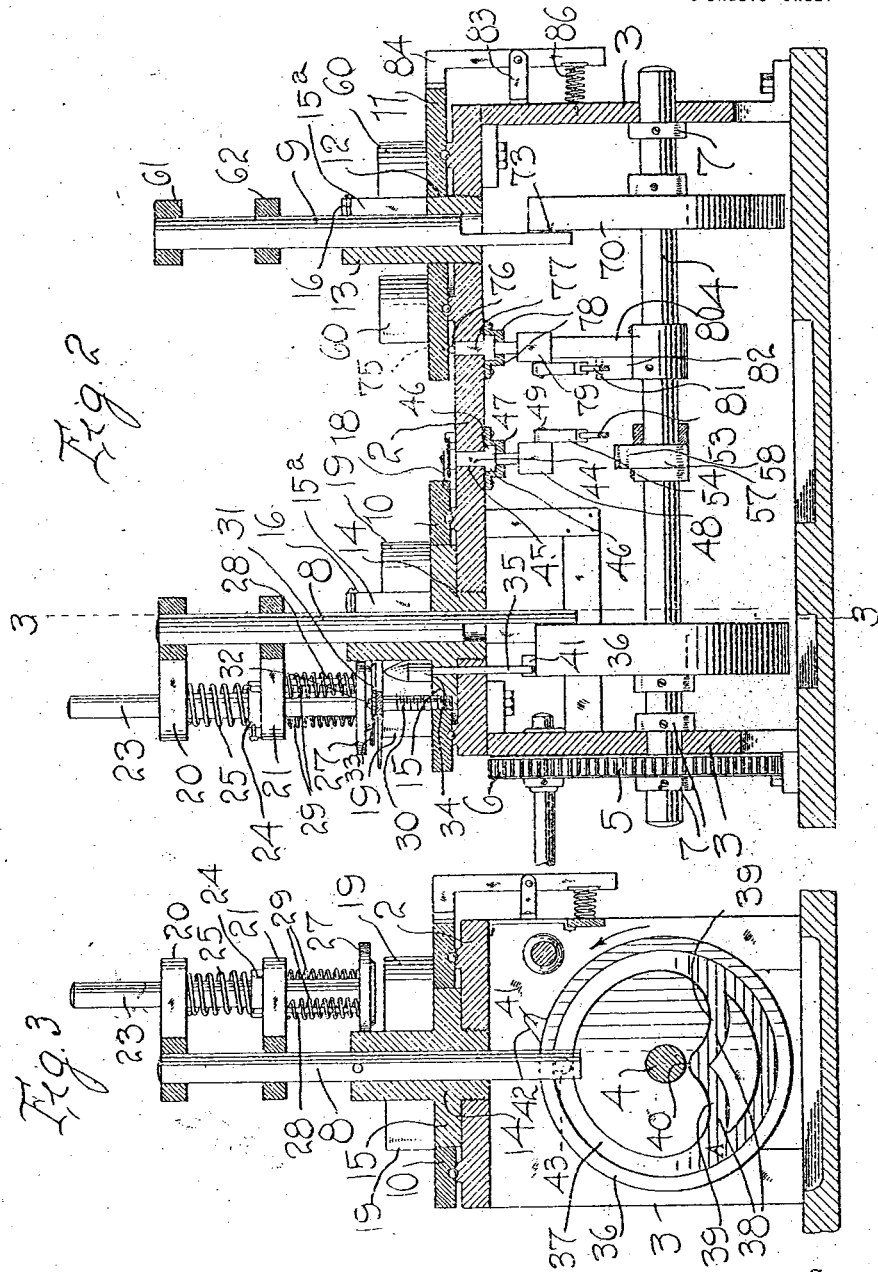

F. R. PERRY & E. S. RICHARDSON.
GLASS FORMING MACHINE.
APPLICATION FILED FEB. 18, 1915.
1,193,182.
Patented Aug. 1, 1916.
3 SHEETS—SHEET 3.
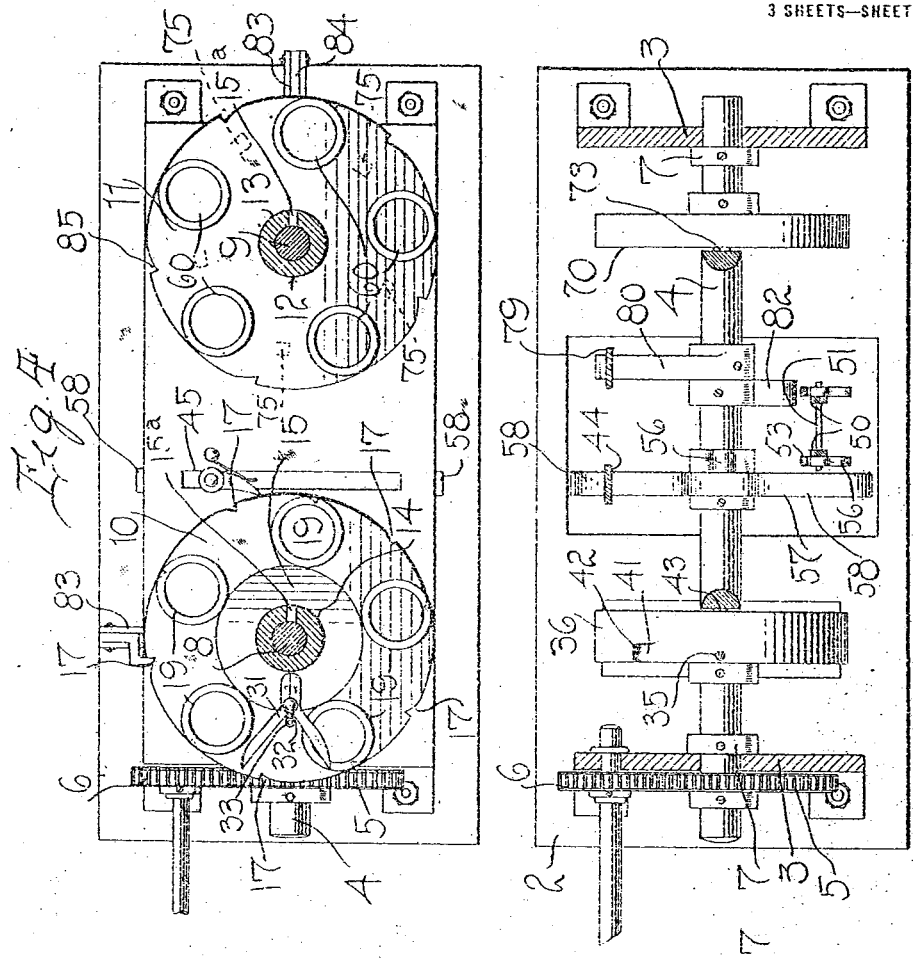
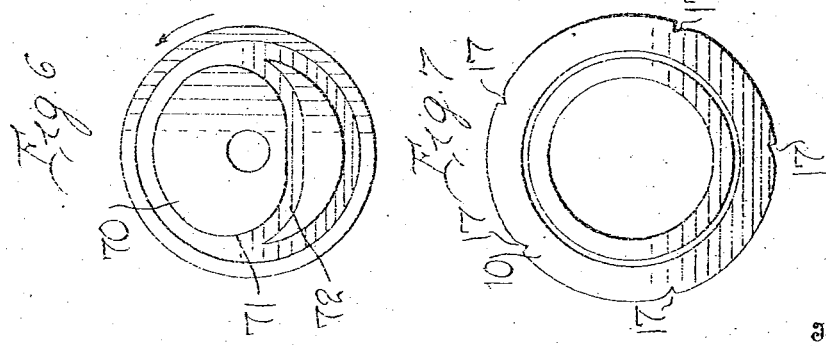
Witnesses
Inventors
FRANK R. PERRY
ERNEST S. RICHARDSON
By Watson E. Coleman
Attorney

UNITED STATES PATENT OFFICE.

FRANK ROBERT PERRY, OF WESTON, WEST VIRGINIA, AND ERNEST S. RICHARDSON, OF ANDERSON, INDIANA.

GLASS-FORMING MACHINE.

1,193,182.

Specification of Letters Patent.  Patented Aug. 1, 1916.

Application filed February 18, 1915.  Serial No. 9,087.

*To all whom it may concern:*

Be it known that we, FRANK R. PERRY and ERNEST S. RICHARDSON, citizens of the United States, residing at Weston and Anderson, in the counties of Lewis and Madison and States of West Virginia and Indiana, respectively, have invented certain new and useful Improvements in Glass-Forming Machines, of which the following is a specification, reference being had to the accompanying drawings.

Our invention relates to glass forming machines, and particularly to machines for making bottles or like containers from glass.

The primary object of our invention is to provide a machine including two sets of molds wherein the molten glass may be placed, and means operating in conjunction with the one set of molds for initially partly forming the vessel, and mechanism operating in conjunction with the second set of molds for completing the formation of the vessel by forcing air into the interior of the partly formed molten glass.

A further object of our invention is to provide means operating in conjunction with the first set of molds whereby the mass of molten glass placed within the molds may be cut off clean across the top of the mold and then the mold moved into position beneath a plunger which operates to force the glass in the mold into contact with the sides of the mold and to form the initial depression or hollow in the molten glass.

A further object of the invention is the provision in connection with the second set of molds of a plunger operating to close the mold and a valve automatically operating when the mold is closed to establish communication between a source of air and the interior of the mold and specifically with the depression previously formed in the molten glass.

A further object of the invention is to provide means for supporting the molds for movement in a close path, and means operating automatically to shift this mold supporting means step by step in this closed path, and further in this connection to provide means for operating the plunger co-acting with the particular set of molds, said operation taking place when a mold is in registration with the plunger.

Other objects will appear in the course of the following description.

My invention is illustrated in the accompanying drawings, wherein—

Figure 1 is a perspective view of a glass forming machine made in accordance with our invention; Fig. 2 is a longitudinal vertical section of the machine; Fig. 3 is a transverse section on the line 3—3 of Fig. 2; Fig. 4 is a top plan view of the table, the rotary mold carriers mounted thereon, the actuating shafts for the plunger being shown in section; Fig. 5 is an underside plan view of the machine; Fig. 6 is a face view of the cam for operating the glass blowing plunger; Fig. 7 is an underside face view of the rotatable table, used in conjunction with the molds for completing the formation of the vessel; Fig. 8 is an elevation, partly in section, of the cam 56 for securing the return of the pawl 18 to its original position; Fig. 9 is a fragmentary sectional view of the tubular plunger 63 showing the valve therein; Fig. 10 is a detail sectional view showing the lower end of the plunger 23 and the mold cap 27 thereon with the operating springs.

Referring to these drawings, it will be seen that our improved glass forming machine comprises a table 2 of any suitable character and supported upon end legs 3. Passing longitudinally through these end legs and supported in suitable bearings therein is the main driving shaft 4 to which power may be communicated in any suitable manner, as by an electric motor, belt or gearing. Merely for the purpose of illustration we have shown the shaft 4 as provided with a gear wheel 5 at one end meshing with a spur gear wheel 6 assumed to be connected to the driving wheels. The shaft is held in position upon the legs 3 by means of collars 7 which prevent longitudinal movement of the shaft.

Disposed adjacent opposite ends of the table 2 and extending upward through the table are the reciprocating plunger operating rods 8 and 9, and rotatably mounted upon the face of the table 2 and respectively concentric to the rods 8 and 9 are the mold carriers 10 and 11. The carrier 11 consists of a disk having a central opening 12 through which projects a hub 13 which is fixed to the table 2 and which extends up through the opening 12, and which surrounds and forms a guide for the rod 9. The table 10 is annular in form, as illustrated clearly in Fig. 3, this annulus rotating around a central hub 14 which is formed with a flange 15 disposed in the same plane as the annular table 10. This hub 14, as illustrated clearly in Fig. 2, is fixed to the table in any suitable manner. Preferably both of the hubs 13 and 14 are longitudinally slotted as at 15ᵃ so that pins 16 projecting from the respective rods 8 and 9 may have sliding movement in these slots, these pins preventing the rotation of these rods 8 and 9 with relation to the hub 14 and the table.

The periphery of the rotatable annular carrier 10 is formed with a plurality of notches 17, and operating in conjunction with these notches is a pawl 18 which is reciprocated in a manner which will be later described, and which thus acts to give a step by step motion to the carrier.

Mounted upon the carrier 10 are a plurality of molds 19, which molds may be of any suitable character but are illustrated as molds designed for the forming of such bottles as milk bottles or like receptacles.

Mounted upon the upper end of the vertical reciprocating rod 8 is an arm 20 and also mounted upon this rod 8 below the arm 20 is an arm 21. Both of these arms are adjustable upon the rod by means of set screws or in any other suitable manner, and the arms may be either angularly adjusted or vertically adjusted upon the rod. Passing through the extremities of the arms and having sliding engagement therein is a plunger rod 23 carrying an adjustable collar 24. A spring 25 surrounds the rod between the arms 20 and 21 and bears against this collar, and therefore urges the plunger rod downward. The lower end of the plunger rod is formed as illustrated in Fig. 10. This plunger is solid at its lower end or head, the head being designated 25ᵃ, and being formed with the somewhat tapered extremity 26. Surrounding this head above its tapered extremity is a sliding mold closure or cap 27 having the form or an annulus or collar from which project upwardly extending pins 28 which pass upward through the arms 21 on diametrically opposite sides of the collar 24, and surrounding these pins 28 are the coiled springs 29 which act to force the closure 27 downward, but which yield to permit a slight upward movement of the closure against the action of the spring 29.

Mounted upon the central non-rotating portion 15 is an outwardly projecting stud 30 upon which is pivoted a pair of shear blades 31, as most clearly shown in Fig. 4. The rear ends of these shear blades project beyond the pivot pin 32 upon which the shear blades are mounted, and a spring 33 acts to urge the rear ends of the shear blades together and the cutting portions of the blades away from each other or into angular relation. Disposed to operate in connection with the rear ends of the blades and to force these rear ends apart so as to thereby close the blades is a wedge or shear actuating member, designated 34 and having approximately the form of a cone, the apex of which is adapted to be inserted between the rear ends of the shear blades whereby as the actuating member is raised the rear ends of the shear blades may be forced into divergent relation to each other and the cutting edges of the shear blades brought together over the mold. Preferably the member 30 or stud supporting the shears has screw threaded vertical adjustment so that the shears may be adjusted in proper position above the mold and in such position that the apex of the shear actuating member will at all times be in position to cause a closing of the shear blades upon the upward movement of the actuating member. The actuating member or head 34 is mounted upon a pin 35 which extends downward through the plunger 15, through the table 2 and into position to be engaged by a tappet tooth mounted upon a cam, as will be now stated.

For the purpose of reciprocating the plunger 23 and actuating the shears, we mount upon the shaft 4 the cam 36. This cam is formed with a cam track 37 which is concentric to the shaft 4 and with a cam track 38 which extends transversely across the face of the cam and which is formed with two bowed portions 39 connected by a reversely bowed portion 40 disposed adjacent the shaft 4. The periphery of the cam 36 is formed at one point with the outwardly projecting tooth or tappet 41, as clearly shown in Fig. 3, which tappet has an inclined face 42 inclined in the direction of rotation of the cam. This tappet 41 is adapted to engage with and to lift the rod 35 of the shear actuating member, and as illustrated this tappet 41 is disposed nearly diametrically opposite the reëntrant portion 40 of the cam track 37.

The rod 8 is formed at its lower end with the inwardly extending pin 43 which engages in the cam tracks 37 and 38. It will now be seen that upon a rotation of the cam in the direction of the arrow, when the entrance A of the cross cam track 38 reaches the pin 43 the pin will be guided into the cam track 38, and the cam will act to draw the rod 8 downward until the pin 43 has reached the reëntrant portion 40 of the cam track. A further rotation of the cam will now act to lift the rod 8 and of course lift with it the plunger 23 until the pin 43 arrives in the circumferential track 37. A continued rotation of the cam in the direction of the arrow, Fig. 3, will now act to hold the plunger rod 8 in raised position during practically a half revolution of the shaft 4, and during this period when the plunger is raised the tappet 41 will engage with the rod 35 and cause the lifting up of the shear actuating head 34 and the closing of the shear blades. As soon as the pin 35 has ridden over the tappet 41 it will drop to the position shown in Fig. 2 and in position to be again engaged by the tappet 41.

The means for securing a rotation of the annular carriage 10 is as follows: As before stated, the periphery of the carriage is formed with the notches 17, these notches being engaged by a pawl 18. This pawl is pivotally mounted upon a slide 44 which reciprocates in a slot 45, as shown clearly in Fig. 2. The slide is formed with laterally extending base flanges 46 which engage in angular guides 47 carried upon the under side of the table. The extremity of the slide has a downwardly extending abutment 48 carrying a laterally extending pivot pin 49. Supported in brackets 50 projecting downward from the bottom of the machine is a transverse fixed shaft 51, shown most clearly in Fig. 1, the shaft projecting at its ends beyond these brackets, and rotatably mounted upon this fixed shaft are the telescopic links 52, one of which is shown in Fig. 8. This telescopic link consists of a rod 53 having sliding engagement with a tubular member 54, this tubular member being pivoted upon the pivot pin 49. The lower end of the rod 53 as before stated, embraces and is rotatably mounted upon the fixed shaft 51, and as shown in Fig. 1, is provided with the downwardly projecting finger or tongue 55 adapted to be engaged by the diametrically projecting arms 56ª of a double cam 56. These arms have curved converging faces and act to engage the tongue 55 and cause a rearward movement of the link and the retraction or rearward movement of the slide 44. It will be understood, however, that a spring might be used to cause a retraction of this slide if desired. We regard the means illustrated, however, as being more positive in its action. For the purpose of shifting the slide forward to cause a rotation of the carrier 10 to a predetermined angular distance, twice for each rotation of the shaft 4, we provide upon the shaft 4 the double cam 57 which is provided with two arms 58, these arms as clearly illustrated in Fig. 1, being set at a slight angle to each other, the surface of the arms being rounded.

In the mechanism so far described it will be obvious that a rotation of the shaft 4 in the direction of the arrow in Fig. 3 will cause one of the arms 58 of the cam 57 to engage the downwardly projecting abutment 48 of the slide 44 to thereby cause a forward movement of the slide, the pawl 18 of which, engaging in one of the notches 17, will cause a rotation of the carrier 10 to such an extent as will bring one of the molds 19 into position immediately beneath the shears which at this time are open. As soon as this has been accomplished the arm 58 will leave its engagement with the abutment 48 and at this time one of the arms 56ª of the double-armed cam 56 will engage with the tail 38 of the link 52 to cause a rearward motion of the slide to its original position. Shortly after this has occurred the tappet 41 will engage the shear actuating rod 35, causing it to lift and close the shears, thus cutting off the molten glass which has previously been placed within the mold by the gathering boy. As soon as this has occurred the slide 44 again moves forward under the action of the double-armed cam 56, rotating the carrier 10 a sufficient distance to bring the mold in which the glass has been cut off into alinement with the plunger 33. At this time the pin 43 on the plunger enters the cross cam track 38 at the point A, as previously described and the rod 8 moves downward to its full extent. As the rod 8 moves downward the plunger is carried downward, the mold closure 27 engages the upper face of the mold and is held in engagement with the upper edge of the mold by means of the springs 29. A continuation of the rotation of the cam causes the downward movement of the plunger, the plunger thus compressing the molten glass within the mold so that the molten glass will fill up the mold to thereby form the neck of the vessel, the plunger leaving a central depression in the molten glass. This completes the first stage in the operation of forming the vessel, and after the vessel has been thus partially completed the partly formed vessel will be transferred by the transfer boy to one of the blow molds on the carrier 11.

The purpose of the next operation is to provide for successively moving the molds containing the partly finished vessel into position beneath a plunger which closes the top of the mold, this plunger being tubular, and being connected to a source of air so as to complete the formation of the vessel by blowing the partially melted glass into the proper form.

As illustrated in Fig. 1, the rotatable carrier 11 is provided with a plurality of molds, designated 60 arranged equidistantly upon the carrier. The carrier is intermittently rotated in nearly the same manner in which the carrier 10 is intermittently rotated, and the specific manner of rotating this carrier will be later stated. The vertical reciprocating rod 9 carries upon it the upper and lower arms 61 and 62, and supported in the outer ends of these arms for vertical movement is the tubular plunger 63 which at its upper end is adapted to be connected by a flexible tube or other means to a source of air under compression. The lower end of this plunger is formed with a cap or closure 64, and disposed between this closure and the lower arm 62 is a coiled spring 65 adapted to resist any upward movement of the plunger. A collar 66 is mounted upon the plunger 63 so as to limit the downward movement of the plunger relative to the arms 61 and 62. The tubular plunger 63 is provided with a valve 67, which as illustrated, is a rotatable valve, so disposed that when turned in one position it will prevent the passage of air through the tubular plunger, and when turned in the other position will permit the passage of air through the tubular plunger. This valve 67 is provided with an outwardly projecting arm 68, and connecting the outer end of this arm with the arm 62 is a link 69. Normally when the parts are in the position shown in Fig. 1 the valve 67 is closed, and this valve will remain closed so long as the plunger 63 has such position that the arm 68 is approximately parallel to the arm 62. Now upon a downward movement of the rod 9 the plunger will be carried downward until the cap 64 bears against the top of one of the molds. A further downward movement of the rod 9 will cause a downward movement of the arms 61 and 62 relative to the plunger and will then cause compression of the spring 65 and act to hold the cap 64 in tight contact with the mold. This further downward movement of the plunger will cause the opening of the valve 67 because of the lowering of the arm 62 relative to the valve 67, thus causing a downward movement of the arm 68 and opening the valve. While the head 64 is in contact with the mold and the valve is open air will be forced into the mold and the bottle will be blown in a manner readily understood by those cognizant with the art.

The means whereby a proper timing and reciprocation of the rod 9 is secured is as follows: Mounted upon the shaft 4 is a cam 70, which is shown in Fig. 6. This cam 70 has a circumferential cam 71 and a transversely extending cam track 72 which is of course eccentric to the axis of the shaft. The lower end of the rod 9 has a laterally projecting pin 73 which engages in the cam tracks. Assuming that the rod 9 is raised, then upon a rotation of the shaft 4 and a rotation of the cam in the direction of the arrow, Fig. 6, the point will enter the cam track 72 and this cam track will cause the rod 9 to be drawn downward in the manner described. When the pin issues from the cam track 72 it will engage the concentric portion 71 of the cam track and travel therealong until it again reaches the entrance of the cam track 72. Thus there will be one actuation of the blowing plunger for each rotation of the shaft 4.

While we do not wish to limit ourselves to any specific means for intermittently rotating the carrier 11, we have shown in this instance the under face of the carrier 11 as formed with ratchet teeth 75 with which a pawl or dog 76 is adapted to engage, this pawl being mounted upon a slide 77 mounted in guides 78. The slide has a depending member 79 with which a wiper cam 80 mounted upon the shaft 4 engages. This wiper cam operates in exactly the same manner as does the double cam 57 and the slide is returned to its original position by means of the same mechanism as heretofore described, that is, by having pivoted upon the member 79 the telescopic link 81 which is pivoted at its lower end in the manner illustrated in Fig. 1 and which is engaged by a single-bladed cam 82 of practically the same form as the cam 56 but having only one blade. Preferably of course the carriers 10 and 11 are mounted upon ball bearings, but any means for reducing friction may be used.

In order to prevent a rearward movement of the carriers 10 and 11 during the rearward movement of the actuating pawls we provide spring actuated detents or pawls, one of which is shown in Fig. 1, each of these detents comprising a bracket 83 and a pivoted latch 84, one end of which is adapted to engage notches 85 formed in the edge of the carrier 11 (or engage the notches formed in the edge of the carrier 10), the lower end of which is pressed outward by means of a spring 86.

The operation of our mechanism will be fully understood from what has gone before. As before stated, the molten glass is placed in one of the molds on the table 2, this mold is shifted beneath the shears and the shears are operated to cut the glass off the top of the mold. The mold then passes to the plunger and the vessel or bottle is partially formed. The transfer boy then transfers the partially formed vessel to the second set of molds and upon a depression of the mold closure air is forced into the interior of the molten glass vessel and the vessel is blown. Afterward the completely formed vessel is removed from the mold.

While we have illustrated what we believe to be the best and most effective features of our invention we do not wish to be limited to this, as it is obvious that many changes might be made without departing from the spirit thereof.

Having thus described this invention, what we desire to claim and secure by Letters Patent, is:—

1. In a glass forming machine, a reciprocating rod, arms vertically and angularly adjustable on the rod, a glass forming plunger slidably mounted in said arms for vertical movement and disposed parallel to the reciprocating rod, a spring urging the said plunger downward and engaging one of said arms, and an adjustable stop limiting the downward movement of the plunger, said stop being engaged by the spring and normally bearing against one of said arms.

2. In a glass forming machine, a table, a tubular member fixedly mounted upon the table and extending upward therefrom, said member being longitudinally split, a mold carrier rotatable around the tubular member and with relation thereto, a vertically movable rod disposed through the tubular member, means engaging the lower end of the rod for reciprocating it, angularly and vertically adjustable arms mounted upon said rod and spaced from each other, a plunger mounted on said arms for vertical movement independent of the arms, a spring urging the plunger downward, a stop limiting the downward movement of the plunger, and a mold closing cap mounted upon the lower end of the plunger for free vertical movement, springs resisting the upward movement of the cap relative to the plunger, and a radially projecting member mounted upon the reciprocating rod and extending into the slot of the tubular member.

3. In a glass forming machine, a table, a hub mounted upon the table, a rotatable mold carrier mounted upon the table and rotating around said hub, a plurality of molds on the carrier, a fixed stud upon the hub extending upward therefrom, a pair of shears mounted upon said stud and extending over the path of movement of the molds, said shears having extensions projecting rearward beyond the pivot of the shears, a vertically reciprocatable shear actuating rod vertically oscillatable through the table and the hub and having a wedge-shaped head at its upper end adapted to be inserted between the rear ends of the shear blades to cause the closing of the shears, said rod and head being normally depressed below the shears, a spring urging the shear blades to a divergent position, and means for rotating the mold carrier to bring a mold beneath the blades, then actuating said rod to cause the closing of the blades, and then again moving the carrier to bring another mold beneath the blades.

4. In a glass forming mechanism, a rotatable mold carrier having ratchet teeth, a slide having movement tangential with the slide, a pawl carried by the carrier for engagement with the ratchet teeth, a member projecting from the slide, a driving shaft, a cam mounted upon the driving shaft and wiping against said member to cause a movement of the slide in one direction, a telescoping link pivoted to said slide at one end, and pivotally supported at its other end and having a tail projecting beyond the pivotal support, and a cam mounted upon the shaft and engaging said tail to thereby cause a positive retraction of the slide.

5. In a glass forming mechanism, a rotatable mold carrier having ratchet teeth, a slide having movement tangentially to the carrier, a pawl carried by the slide for engagement with the ratchet teeth, means for intermittently shifting the slide in a direction to cause the pawls to engage with the teeth, and a telescopic link operatively pivoted to said slide at one end and pivotally supported at its other end and having a tail projecting beyond the pivotal support, and means intermittently engaging said tail to thereby cause a positive retraction of the slide in a direction opposite to the direction first-named.

In testimony whereof we hereunto affix our signatures in the presence of two witnesses.

FRANK ROBERT PERRY.
ERNEST S. RICHARDSON.

Witnesses to signature of Frank Robert Perry:
CLYDE P. MARINE,
E. O. SWICK.

Witnesses to signature of Ernest S. Richardson:
CHARLES E. KULM,
CHAS. R. HOWELL.